(12) United States Patent
Moran et al.

(10) Patent No.: US 12,511,374 B2
(45) Date of Patent: Dec. 30, 2025

(54) RECONFIGURABLE ATTACK COUNTERMEASURES DEPLOYED IN SOFTWARE

(71) Applicant: Arm Limited, Cambridge (GB)

(72) Inventors: Brendan James Moran, Coton (GB); Michael Bartling, Austin, TX (US)

(73) Assignee: ARM LIMITED, Cambridge (GB)

( * ) Notice: Subject to any disclaimer, the term of this patent is extended or adjusted under 35 U.S.C. 154(b) by 239 days.

(21) Appl. No.: 18/200,724

(22) Filed: May 23, 2023

(65) Prior Publication Data

US 2024/0394361 A1 Nov. 28, 2024

(51) Int. Cl.
*G06F 21/54* (2013.01)
*G06F 21/56* (2013.01)

(52) U.S. Cl.
CPC ............ *G06F 21/54* (2013.01); *G06F 21/563* (2013.01); *G06F 2221/033* (2013.01)

(58) Field of Classification Search
CPC .. G06F 21/54; G06F 21/563; G06F 2221/033; G06F 21/577; G06F 21/53; G06F 21/55
See application file for complete search history.

(56) References Cited

U.S. PATENT DOCUMENTS

| | | | | |
|---|---|---|---|---|
| 11,146,572 B2 * | 10/2021 | Gupta | ................... | H04L 63/145 |
| 2019/0303585 A1 * | 10/2019 | Ofek | ..................... | G06F 21/577 |
| 2020/0133885 A1 * | 4/2020 | Tshouva | .................. | G06F 21/64 |
| 2020/0285742 A1 * | 9/2020 | Sawas | ...................... | G06F 21/64 |
| 2020/0356365 A1 * | 11/2020 | Pezaris | ..................... | G06F 8/73 |
| 2021/0303312 A1 * | 9/2021 | Degioanni | ............ | G06F 9/3005 |
| 2022/0004642 A1 * | 1/2022 | Pujar | ..................... | G06F 21/577 |

OTHER PUBLICATIONS

Code Renewability for Native Software Protection, 2020 (Year: 2020).*
Lightweight_and_Efficient_Hypervisor-Based_Dynamic_Binary_Instrumentation_and_Analysis_Method, 2020 (Year: 2020).*

* cited by examiner

*Primary Examiner* — Philip J Chea
*Assistant Examiner* — Jasmine Mochen Day
(74) *Attorney, Agent, or Firm* — Talem IP Law, LLP (57) ABSTRACT

A method is provided that includes receiving a source code block of a source code and a sensor configuration associated with the source code block, performing instrumentation on the source code block at least two times to generate corresponding at least two differently instrumented code blocks from the source code block, creating a corresponding model of the sensor configuration for each differently instrumented code block, and receiving a request for an instrumented variant of the source code block for execution by a processing element and deploying the instrumented variant of the source code block to the processing element. The instrumented variant of the source code block comprises one of the at least two differently instrumented code blocks from the source code block.

17 Claims, 5 Drawing Sheets

RECONFIGURABLE ATTACK COUNTERMEASURES DEPLOYED IN SOFTWARE

BACKGROUND

With the ubiquitousness of software, computers, and networked environments, malicious actors have many ways to access confidential information and interfere with devices. Constantly reacting to emerging attack vectors (e.g., as part of cybersecurity) can be a drain on resources; however, proactively addressing software security is a difficult proposition and still prone to human error. Indeed, it can be challenging to monitor all systems and code.

In order to address software security, an attack countermeasure can be utilized and deployed to similar devices. If an attacker can decode the attack countermeasure, or defense model used, on one device, it can be used as a basis for attack development and/or attacks on other similar devices.

BRIEF SUMMARY

Methods to reconfigure attack countermeasures deployed in software are described. The described methods include deploying obfuscated variants of software blocks to frustrate the efforts of an attacker attempting to attack similar devices utilizing the software block. The described methods can include or can be used in conjunction with a monitoring system that can detect or identify a potential attack during execution of a software program.

A method includes receiving a source code block of a source code and a sensor configuration associated with the source code block, performing instrumentation on the source code block at least two times to generate corresponding at least two differently instrumented code blocks from the source code block, creating a corresponding model of the sensor configuration for each differently instrumented code block, and receiving a request for an instrumented variant of the source code block for execution by a processing element and deploying the instrumented variant of the source code block to the processing element. The instrumented variant of the source code block comprises one of the at least two differently instrumented code blocks from the source code block.

A non-transitory computer-readable medium is provided. The computer-readable storage medium includes instructions that when executed by a processing element perform a method. The method includes receiving a source code block of a source code and a sensor configuration associated with the source code block, performing instrumentation on the source code block at least two times to generate corresponding at least two differently instrumented code blocks from the source code block, creating a corresponding model of the sensor configuration for each differently instrumented code block, and receiving a request for an instrumented variant of the source code block for execution by a processing element and deploying the instrumented variant of the source code block to the processing element. The instrumented variant of the source code block comprises one of the at least two differently instrumented code blocks from the source code block.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Methods to reconfigure attack countermeasures deployed in software are described. The described methods include deploying obfuscated variants of software blocks to frustrate the efforts of an attacker attempting to attack similar devices utilizing the software block. The described methods can include or can be used in conjunction with a monitoring system that can detect or identify a potential attack during execution of a software program.

Sometimes a code developer utilizes a static sensor configuration associated with a code as an attack countermeasure to alert a defender of access to the code by the malicious actor, e.g., an attacker. However, to work effectively against the attacker, the sensor configuration needs to be kept secret. If the sensor configuration is discovered by the attacker, the attacker can simply avoid it. For example, if the executable code is publicly known and accessible to the attacker, the location of the sensor configuration within the code may be deduced. In addition, if similar devices share a sensor configuration, then that configuration is a de facto secret across devices. A compromise of one device is a compromise of all the devices sharing the secret. Therefore, if the attacker knows, or can figure out, the location of the sensor configuration within the code, e.g., because the source code is accessible to the attacker, the attacker can avoid the attack countermeasure.

By adding another layer of security as described herein, it is possible to further frustrate the efforts of the attackers. By randomly deploying differently instrumented variants of the same source code to one or more computing devices, even if the location of the sensor configuration is discovered by the attacker for one variant deployed on a computing device, the location of the sensor configuration for the other variants deployed on other computing devices can be kept secret.

Figure 1:
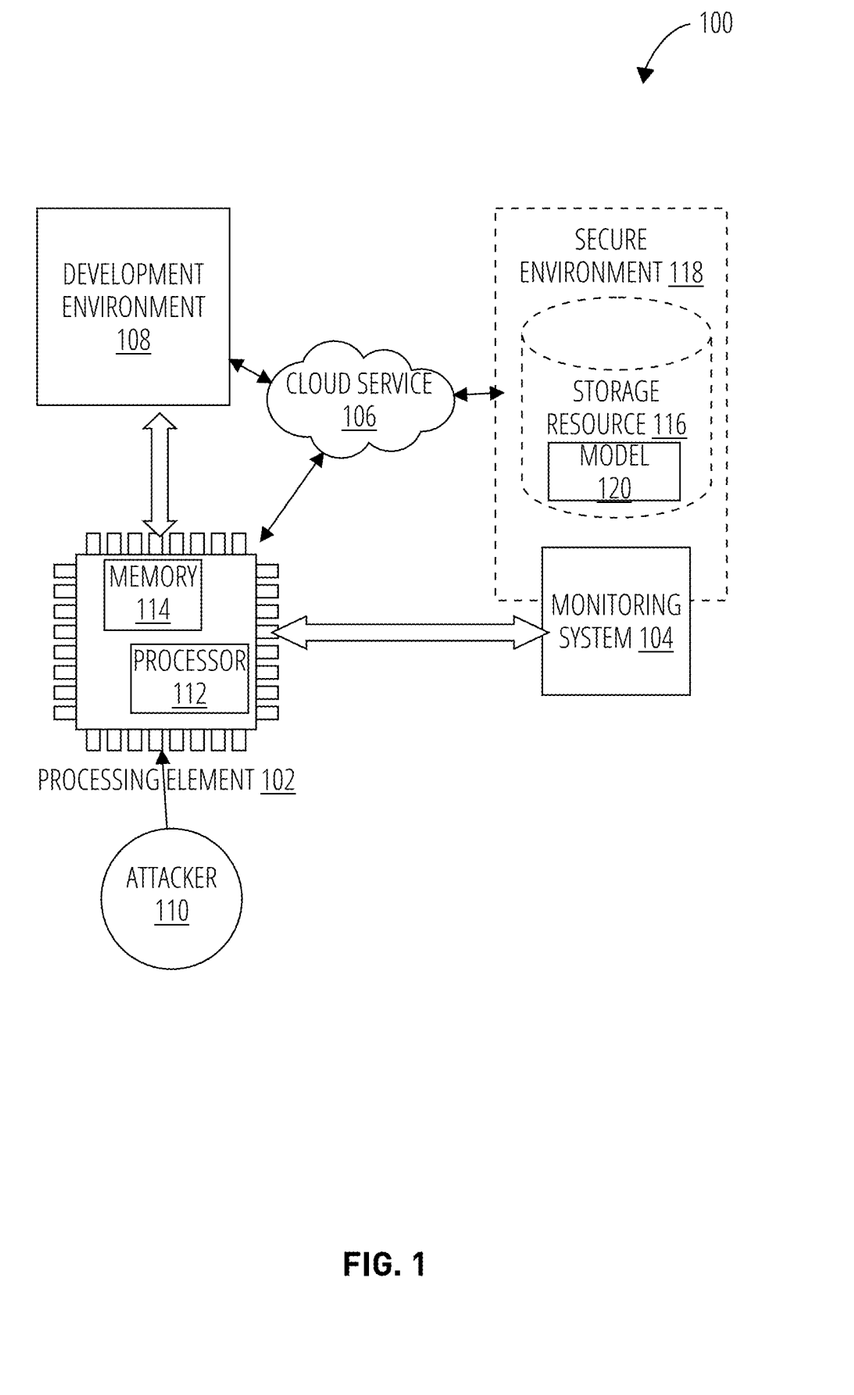
FIG. 1 illustrates an operating environment in which software is developed, deployed, and run.

FIG. 1 illustrates an operating environment in which software is developed, deployed, and run. Referring to FIG. 1, operating environment 100 includes a development environment 108, which may be embodied in computing system 500 described with respect to FIG. 5, and a monitoring system 104, which may be part of processing element 102 or a separate computing device in communication with processing element 102. While one processing element 102 is shown for illustrative purposes, processing element 102 can represent multiple processing elements forming a group of computing devices. A cloud service 106 on a cloud-based server can establish communication with both a development environment 108, the processing element 102, and the monitoring system 104. The cloud service 106 can facilitate delivery of the compiled code to the processing element 102. An attacker 110 desires access to the confidential code on the processing element 102, which can include access to a sensor configuration associated with the confidential code, for malicious purposes.

Software developers can develop source code within the development environment 108. The development environment 108 is the tool used by software developers to efficiently develop a code or program. The development environment 108 can include a compiler 202 (shown in FIG. 2) that translates the source code from a high-level programming language to a lower level, such as to an intermediate representation, and ultimately, to executable code. The source code can also be compiled in the compiler 202 in the cloud service 106, such as in the example of FIG. 2.

Processing element 102 shown in FIG. 1, includes a processor 112 and memory 114. Although specific reference is made to a processor 112, processor 112 can be any processing element such as, but not limited to, a central processing unit (CPU), graphics processing unit (GPU), microcontroller, or computing unit (e.g., multiplier-accumulator (MAC) unit with memory). The processing element can also be virtualized, such as in emulated environments like QEMU (Quick Emulator). Memory 114 can include volatile and non-volatile memory hardware and can include built-in (e.g., system on a chip) and/or removable memory hardware. Examples of volatile memory include random-access memories (RAM, DRAM, SRAM). Examples of non-volatile memory include flash memory, various read-only memories (ROM, PROM, EPROM, EEPROM), phase change memory, magnetic and ferromagnetic/ferroelectric memories (MRAM, FeRAM). It should be understood that there are different levels/hierarchy of memory and components that may be used (e.g., cache memories, processor registers, system RAM, disk drives, secondary storage, etc.). The memory 114 can store a computer program, or the instrumented code with a sensor configuration, in the memory 114.

Although not shown in FIG. 1, processing element 102 typically includes an operating system or other piece of software that performs one or more functions of an operating system (e.g., which may be found as part of firmware). Functions of an operating system include a loader which loads a program, or code, into a memory space used by the processing element, directing the processing element to the memory address at which the program begins in order to begin execution of the program, supervising the code while the process code is running, responding to requests by the code for shared system resources, and removing the code (and other related data) from the memory space. The loader typically runs in kernel space, i.e., a secure environment on the processing element 102.

The monitoring system 104 can monitor activity on the processing element 102 with respect to executing the program. The monitoring system 104 can be associated with or have access to the storage resource 116 and a secure environment 118. The secure environment 118 may be a data center such as a cloud data center and may include specialized hardware such as a hardware security module (HSM). Monitoring system 104 includes a software program that can run in the secure environment 118.

Figure 2:
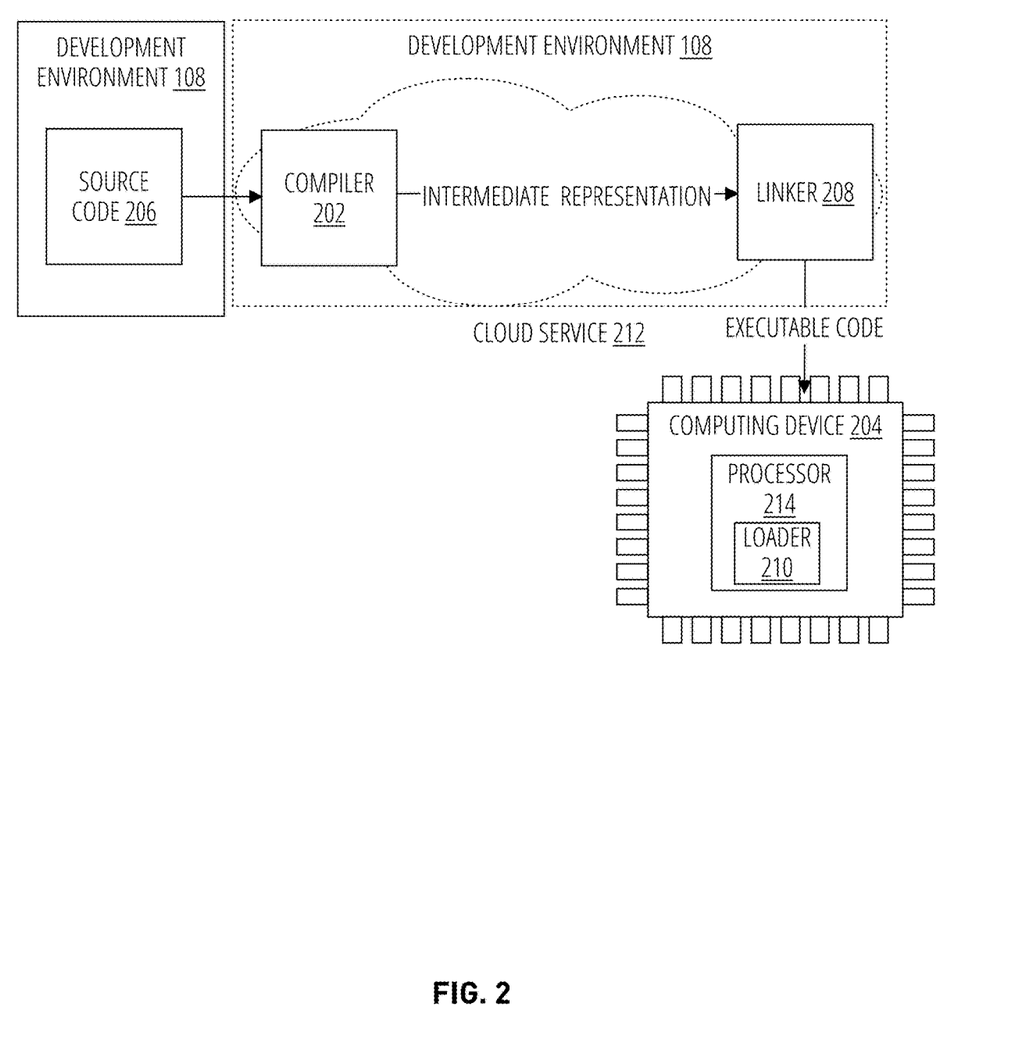
FIG. 2 illustrates the stages of code development and the entities involved with the production of the code.

FIG. 2 illustrates the stages of code development and the entities involved with the production of the code. After the source code 206 is developed, the source code 206 is compiled by the compiler 202 that translates the source code 206 from a high-level programming language to a lower level, such as to an intermediate representation, and ultimately, to executable code. The source code 206 can either be compiled by the development environment 108 or by a compiler in the cloud service 212, as depicted by the dotted lines in FIG. 2.

The source code 206 can be a production application code, for example. The code can be instrumented, e.g., including code in addition to the application code, for monitoring behavior of the code. In some cases, the instrumented code includes a static sensor configuration associated with the instrumented code for malicious software detection. The instrumented code with the sensor configuration can be deployed or otherwise provided to a computing device 204 for normal execution.

A linker 208 combines files having routines in the intermediate representation in a functional order. The linker can also either be in the development environment 108 or the cloud service 106. Then, as stated above, a loader 210 on the computing device 204 loads the linked code, into a memory space used by the processor 214, directing the processor 214 to the location in memory at which the program begins to begin execution of the program. In some cases when the source code includes a sensor configuration, a model describing the sensor configuration is securely loaded onto the computing device 204.

Figure 3:
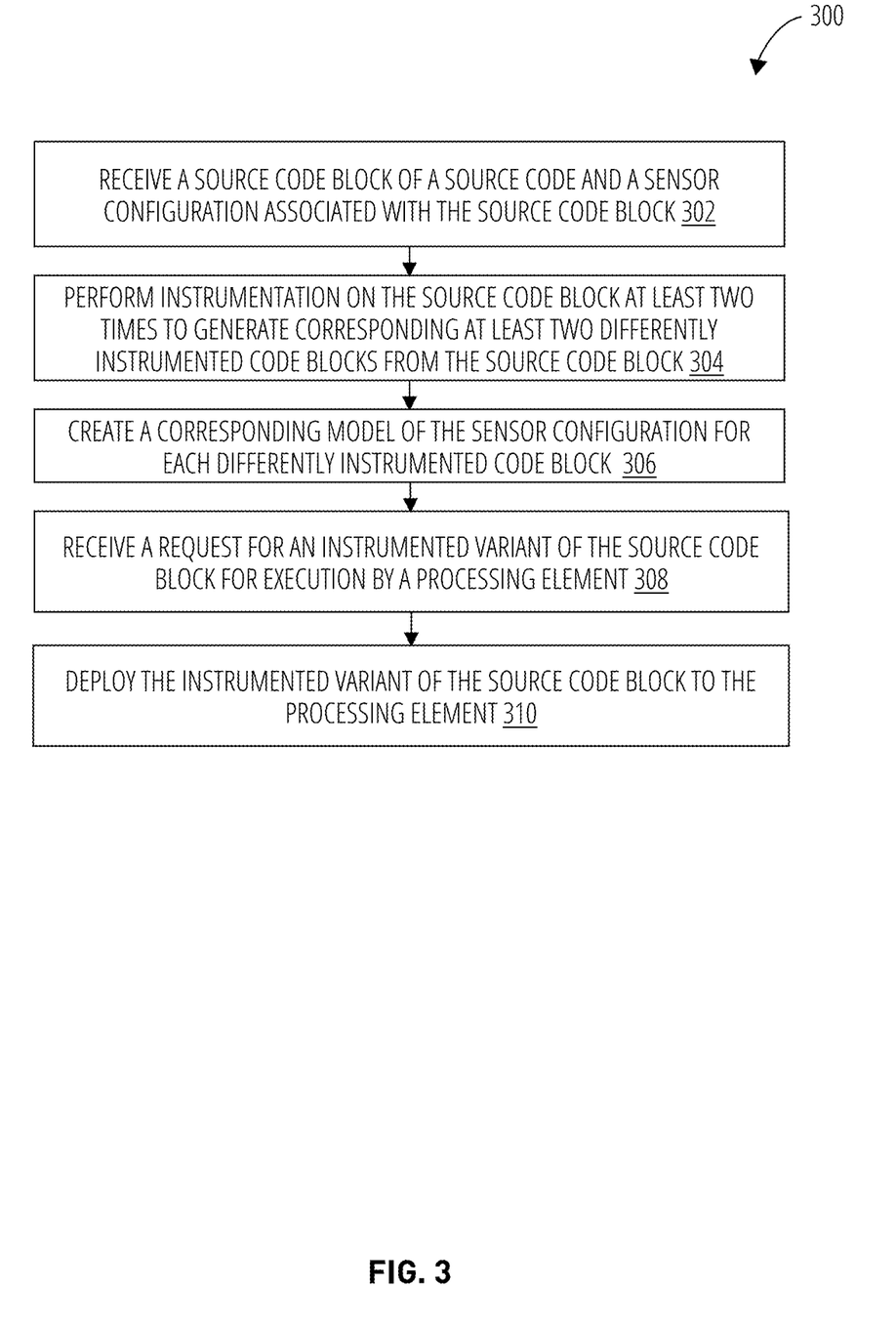
FIG. 3 illustrates a method for deploying a reconfigurable attack countermeasure in accordance with one embodiment.

FIG. 3 illustrates a method for deploying a reconfigurable attack countermeasure in accordance with one embodiment. Method 300 is performed statically, e.g., prior to the generation of the executable code, in either the development environment 108 or by the cloud service 106. Referring to FIG. 3, method 300 includes receiving (302) a source code block of a source code and a sensor configuration associated with the source code block. Method 300 further includes performing (304) instrumentation on the source code block at least two times to generate corresponding at least two differently instrumented code blocks from the source code block and creating (306) a corresponding model of the sensor configuration for each differently instrumented code. Upon receiving a request from a processing element for a variant of the source code block, the variant comprising one of the at least two differently instrumented code blocks from the source code block, deploying (310) the variant to the processing element. The variants can be chosen randomly by the development environment 108 or the cloud service 106 for deployment.

Method 300 includes receiving (302), by the development environment 108 or the cloud service 106, a source code block and a sensor configuration associated with the source code block. The source code block is a block (e.g., a portion) of code of the source code 206 written by a developer in the development environment 108. The source code of the source code block can include multiple routines disposed in an order. The sensor configuration is a software construct used as an attack countermeasure and is associated with the source code block. As described herein, the sensor configuration can be an embedded sensor configuration within the source code, or the sensor configuration can be a software tripwire. These two sensor configurations are utilized for exemplary purposes only throughout the disclosure. Other types of sensor configurations may be used in the provided methods as well.

In some cases, the sensor configuration is embedded within the code during development in the development environment 108. The embedded sensor configuration can include intentionally weak code. The intentionally weak code can be injected within the code during development to lure and confuse attackers, as a software honeypot, so that attackers cannot distinguish between a real coding weakness and the injected weak code. As an example, the intentionally weak code can include dead code, or code that under normal operating conditions should never get executed. When the intentionally weak code is accessed during execution, a security alert is triggered.

In some cases, the sensor configuration is a software tripwire. A software tripwire is a cybersecurity approach that defines a region of the source code block that should never be reached or accessed. When that region of code is accessed, e.g., the tripwire is tripped, the software tripwire sends a notification that an attack has occurred. As used throughout the disclosure, software tripwires are specific locations within the source code block that are marked as non-executable. When the software tripwire is accessed, a security alert is triggered.

Method 300 further includes performing (304) instrumentation on the source code block at least two times to generate corresponding at least two differently instrumented code blocks from the source code block. In some cases, the instrumentation can be performed by the developer within the development environment 108. Alternately, the instrumentation can be performed within the cloud service 106. The cloud service 106 can include an application store where users can download software applications. In general, instrumenting code refers to introducing additional code or data without changing the behavior of the code for the purpose of analyzing and/or measuring the behavior of the code.

When the sensor configuration is an embedded sensor configuration such as intentionally weak code, the instrumentation can include performing a path profiling on the source code block to generate a particular path identifier for each path within the source code block each time the instrumentation is performed. Each time the instrumentation is performed different instrumentation points, or path identifiers, are generated creating differently instrumented code blocks.

Path profiling algorithms count how often each path through a routine or program is taken at runtime. The path profiling can be performed from a control flow graph of the intermediate representation using the Ball and Larus path profiling algorithm, for example. The Ball and Larus method of path profiling takes in a control flow graph and for any arbitrary path in the control flow graph, gives as an output an arithmetic that generates a particular path identifier, or path ID during execution. Generating a new instrumentation variant can include changing a weight input to the Ball and Larus method, thus changing the arithmetic generated and therefore the corresponding path IDs for each path of execution. Additionally, the Ball and Larus algorithm can determine the frequency of each control flow path in the program. Users can also specify particular path IDs that will generate an alert when executed.

Method 300 further includes creating (306) a corresponding model of the sensor configuration for each differently instrumented code block. In the case that path profiling is used, the path profiling can include marking the intentionally weak code within the source code block by assigning an attribute to the weak code, prior to the path profiling and then creating an embedded sensor configuration table so that each particular path identifier is mapped to its corresponding weak code path. The embedded sensor configuration table is provided to the monitoring system 104, as a model 120, so that the monitoring system 104 can identify whether the particular path identifiers of the paths corresponding to the intentionally weak code have been or are being executed.

In some cases, the sensor configuration includes a specific location, e.g., a tag, corresponding to a region of code, e.g., a routine in the source code block, configured as a software tripwire such that the specific location should not be executed during normal operation of the executable code corresponding to each differently instrumented code block. If the routine is executed in operation of the executable code, e.g., the software tripwire is tripped, the monitoring system 104 monitoring the executable code, issues a security alert.

When the development environment 108 or the cloud service 106 receives (302) the source code block and the tag to a specific location of the routine, i.e., the sensor configuration, performing (304) instrumentation can include reordering the multiple routines of the source code each time the instrumentation is performed. Thus, each time the instrumentation is performed, the specific location of the software tripwire can be different. The corresponding model created (306) for each differently instrumented code block includes marking the specific location of the sensor configuration in a table that describes where in the order of the multiple routines the one routine that has the tag is located. A copy of the corresponding model can then be provided to the monitoring system 104, as model 120, so that monitoring system 104 can identify whether the specific locations corresponding to the software tripwire have been or are being executed.

Method 300 further includes receiving (308) a request for an instrumented variant of the source code block for execution by a processing element 102. For example, referring to FIG. 4, Computing Device A 410 sends a request 416 to a request handler, such as the development environment 108 or the cloud service 106, for an instrumented source code block for execution on Computing Device A 410. Likewise, Computing Device B 412 sends a request 418 to the development environment 108 or the cloud service 106 and Computing Device C 414 sends a request 420 to the development environment 108 or the cloud service 106 for an instrumented source code block for execution on respective Computing Device B 412 and Computing Device C 414. The computing devices (e.g., Computing Device A 410, Computing Device B 412, and Computing Device C 414) will not be aware that multiple variants of the instrumented source code block exist.

Method 300 further includes deploying (310) the instrumented variant of the source code block to a processing element 102. The development environment 108 or the cloud service 106 can randomly choose one of the at least two differently instrumented code blocks from the source code block.

In an embodiment, a copy of the corresponding model is securely deployed to a monitoring system 104 associated with the processing element 102. In order to keep the sensor configuration secret, the model is encrypted in the copy of the corresponding model and received in a secure environment of the monitoring system 104. The monitoring system 104 monitors an executable code corresponding to the instrumented variant of the source code block utilizing the model 120 running on processing element 102. In some cases, the model 120 will include a mapping of the particular path identifier to its corresponding intentionally weak code for each differently instrumented code block. Simply put, the mapping includes a listing of the particular path identifiers that should never be encountered. In other cases, the model 120 will include a table of specific locations of the software tripwires in the source code block. Monitoring system 104 monitors the executable code during runtime to identify whether locations in memory corresponding to the sensor configuration are being executed. When any of these locations in memory are accessed, the monitoring system 104 generates a notification that the sensor configuration has been accessed. The notification can then be sent to another application to be stored or used by the application to perform a mitigation.

Figure 4:
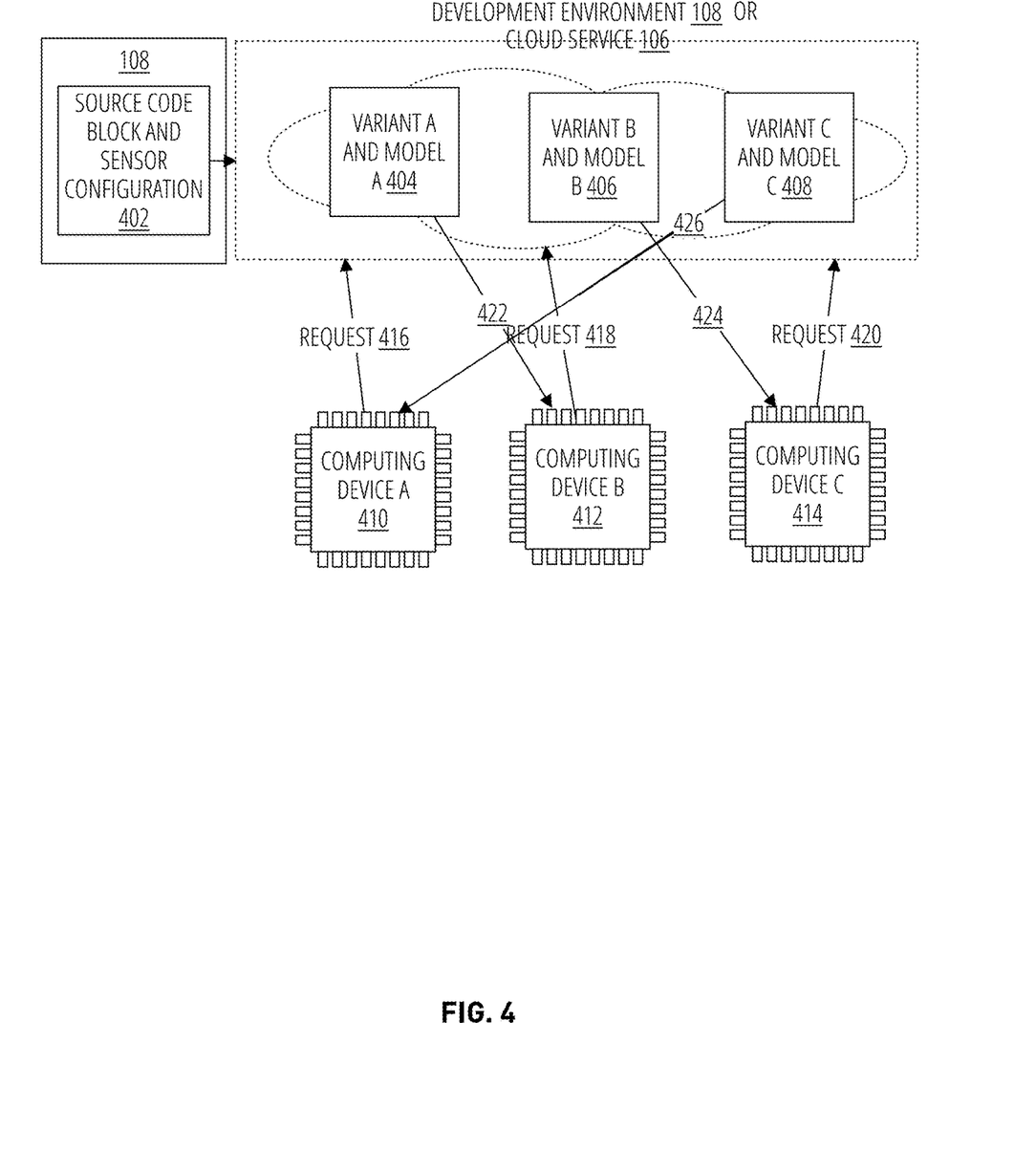
FIG. 4 illustrates an exemplary implementation of the deployment of several instrumented variants of the source code block in accordance with one embodiment.

FIG. 4 illustrates an exemplary implementation of the deployment of several instrumented variants of the source code block in accordance with one embodiment. A source code block and sensor configuration 402 associated with the source code block is developed in a development environment 108. The source code block and the associated sensor configuration can be instrumented within the development environment 108 or within a cloud service 106.

With reference to FIG. 4, the instrumentation is performed three times to generate three differently instrumented variants of the source code block. A model corresponding to the sensor configuration for each differently instrumented code block is also created. Thus, Variant A and model A 404, Variant B and Model B 406, and Variant C and Model C 408 are created within the request handler, e.g., the development environment 108 or cloud service 106. Computing Device A 410, Computing Device B 412, and Computing Device C 414 are shown sending respective requests 416, 418, and 414 to the development environment 108 or cloud service 106 for a instrumented variant of the source code block. The requests 416, 418, and 420, can be sent at the same time or at different times. For example, upon receiving a request 416 from Computing Device A 410, the development environment 108 or cloud service 106 deploys 426 an instrumented variant of the source code block, Variant C and Model C 408, and copy of the corresponding model of the sensor configuration to Computing Device A 410. Likewise, upon receiving request 418 from Computing Device B 412, Variant A and model A 404 is deployed 422 and upon receiving request 420, Variant B and Model B 406 is deployed 424. The deploying includes randomly choosing an instrumented variant of the source code block such that Computing Device A 410, Computing Device B 412 and Computing Device C 414 can each receive any of the instrumented variants of the source code block and copy of the corresponding model, Variant A and model A 404, Variant B and Model B 406, and Variant C and Model C 408. In some cases, more than one computing device 204 can receive a particular instrumented variant of the source code block so that the particular instrumented variant is shared between two or more computing devices.

Figure 5:
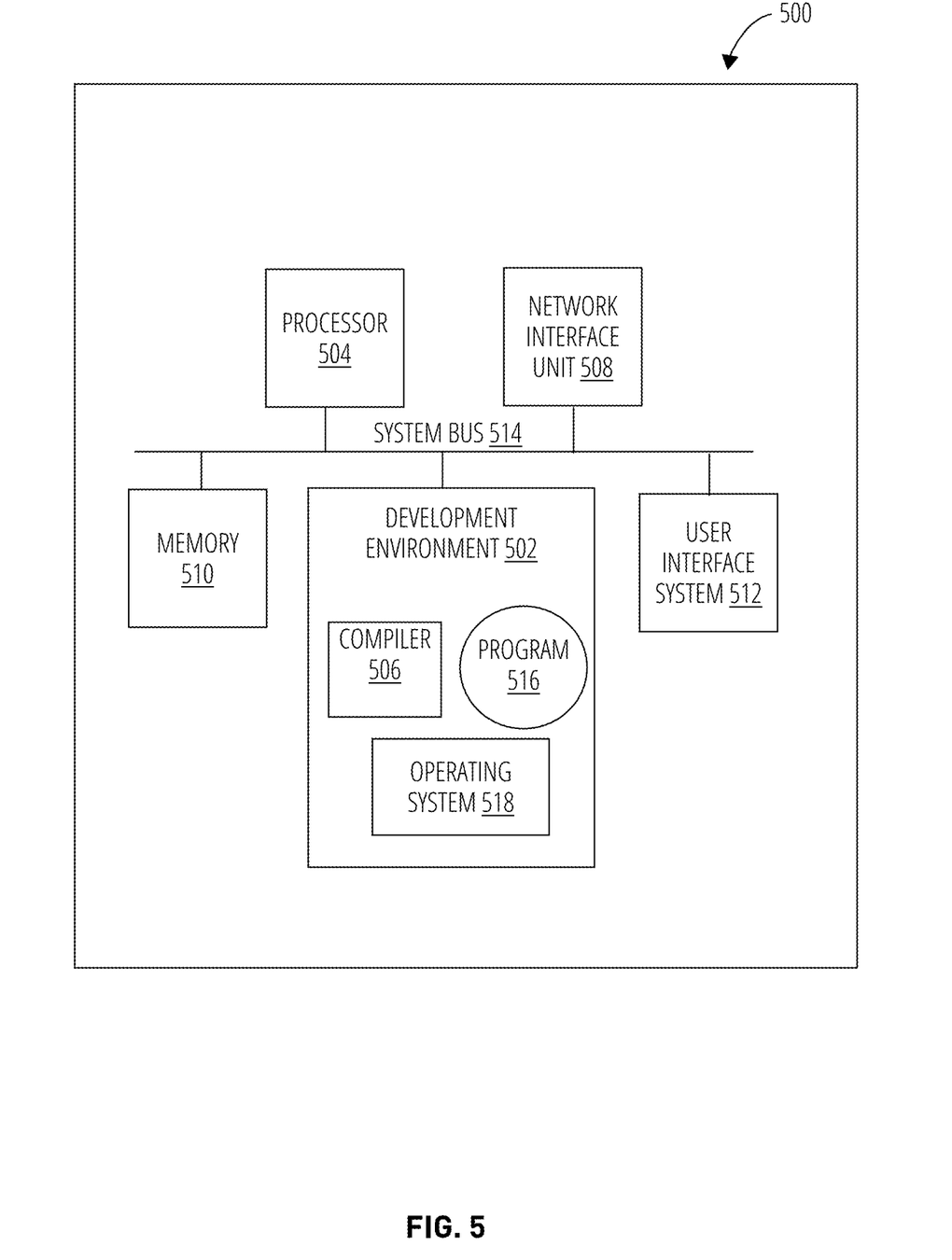
FIG. 5 illustrates a schematic diagram illustrating components of a computing system.

FIG. 5 illustrates a schematic diagram illustrating components of a computing system. It should be understood that aspects of the system described herein are applicable to both mobile and traditional desktop computers, as well as server computers and other computer systems. Components of computing system 500 may represent a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen as some examples. Accordingly, more or fewer elements described with respect to computing system 500 may be incorporated to implement a particular computing system.

Referring to FIG. 5, a computing system 500 can include at least one processor 504 connected to components via a system bus 514, a memory 510, and a Development Environment 502. A processor 504 processes data according to instructions of a program 516, compiler 506, as referenced in FIG. 2 as compiler 202, and/or operating system 518. The program 516 may be loaded into the Development Environment 502 and run on or in association with the operating system 518. Program 516 7 may include the method 300 as described. The computing system 500 can further include a user interface system 512, which may include input/output (I/O) devices and components that enable communication between a user and the computing system 500. Computing system 500 may also include a network interface unit 508 that allows the system to communicate with other computing devices, including server computing devices and other client devices, over a network.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

In operation, the proposed method generates multiple differently instrumented variants of the same source code block at the compile stage in a development environment or in a cloud service. By generating multiple (e.g., at least two) instrumented variants of the same source code block, the differently instrumented variants can be deployed on different computing devices, execute identically, however, confuse an attacker, intent on accessing the sensor configuration, as to the exact location of the sensor configuration in each of the variants. If the attacker does indeed locate the sensor configuration in one variant, a notification is sent by the monitoring system as an alert to a potential attack. When the attacker attempts the same strategy in another variant, by attacking the same memory location, the attack will not succeed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method, comprising: receiving a source code block of a source code and a sensor configuration associated with the source code block, wherein the sensor configuration comprises intentionally weak code embedded within the source code that when accessed during execution triggers a security alert; performing instrumentation on the source code block at least two times to generate corresponding at least two differently instrumented code blocks from the source code block; creating a corresponding model of the sensor configuration for each differently instrumented code block; receiving a request for an instrumented variant of the source code block for execution by a processing element; and deploying the instrumented variant of the source code block to the processing element, wherein the instrumented variant of the source code block comprises one of the at least two differently instrumented code blocks from the source code block, wherein the sensor configuration is an attack countermeasure alerting against access by a malicious actor, wherein the performing of the instrumentation on the source code block at least two times impedes discovery of a location of the sensor configuration within the source code by the malicious actor.

2. The method of claim 1, further comprising securely deploying a copy of the corresponding model to a monitoring system associated with the processing element.

3. The method of claim 1, wherein performing instrumentation on the source code block includes performing a path profiling on the source code block to generate a particular path identifier for each path within the source code block each time the instrumentation is performed.

4. The method of claim 3, wherein creating the corresponding model of the sensor configuration includes a mapping of the particular path identifier corresponding to the intentionally weak code for each differently instrumented code block.

5. The method of claim 1, wherein the method randomly chooses the one of the at least two differently instrumented code blocks from the source code block for deployment.

6. The method of claim 1, wherein the sensor configuration is a software tripwire of the source code block that when accessed during execution triggers the security alert.

7. The method of claim 6, wherein the source code including the source code block comprises multiple routines disposed in an order.

8. The method of claim 7, wherein the software tripwire of the source code block includes a tag corresponding to one routine of the multiple routines of the source code.

9. The method of claim 8, wherein performing instrumentation on the source code block includes reordering the multiple routines of the source code such that a different order of the multiple routines is created each time the instrumentation is performed.

10. The method of claim 8, wherein creating the corresponding model for the sensor configuration for each differently instrumented source code block includes marking a specific location of the sensor configuration in a table that describes where in the order of the multiple routines the one routine that has the tag is located.

11. A non-transitory computer-readable storage medium, the computer-readable storage medium including instructions that when executed by a processing element perform a method, the method comprising:
receiving a source code block of a source code and a sensor configuration associated with the source code block, wherein the sensor configuration comprises intentionally weak code embedded within the source code that when accessed during execution triggers a security alert; performing instrumentation on the source code block at least two times to generate corresponding at least two differently instrumented code blocks from the source code block; creating a corresponding model of the sensor configuration for each differently instrumented code block; receiving a request for an instrumented variant of the source code block for execution by a processing element; and deploying the instrumented variant of the source code block to the processing element, wherein the instrumented variant of the source code block comprises one of the at least two differently instrumented code blocks from the source code block, wherein the sensor configuration is an attack countermeasure alerting against access by a malicious actor, wherein the performing of the instrumentation on the source code block at least two times impedes discovery of a location of the sensor configuration within the source code by the malicious actor.

12. The non-transitory computer-readable storage medium of claim 11, further comprising instructions that direct the processing element to: securely deploy a copy of the corresponding model to a monitoring system associated with the processing element.

13. The non-transitory computer-readable storage medium of claim 11, wherein the instructions to perform instrumentation on the source code direct the processing element to: perform a path profiling on the source code block to generate a particular path identifier for each path within the source code block each time the instrumentation is performed.

14. The non-transitory computer-readable storage medium of claim 13, wherein the instructions to create the corresponding model of the sensor configuration direct the processing element to map of the particular path identifier corresponding to the intentionally weak code for each differently instrumented code block.

15. The non-transitory computer-readable storage medium of claim 11, wherein the method randomly chooses the one of the at least two differently instrumented code blocks from the source code block for deployment.

16. The non-transitory computer-readable storage medium of claim 11, wherein the sensor configuration is a software tripwire of the source code block that when accessed during execution triggers the security alert.

17. The non-transitory computer-readable storage medium of claim 16, wherein the source code including the source code block comprises multiple routines disposed in an order.

\* \* \* \* \*